United States Patent [19]

Bailey et al.

[11] Patent Number: 5,146,572
[45] Date of Patent: Sep. 8, 1992

[54] MULTIPLE DATA FORMAT INTERFACE

[75] Inventors: Roger N. Bailey; Robert L. Mansfield, both of Austin, Tex.

[73] Assignee: International Business Machines Corporation, Armonk, N.Y.

[21] Appl. No.: 593,606

[22] Filed: Oct. 4, 1990

Related U.S. Application Data

[63] Continuation of Ser. No. 273,286, Nov. 17, 1980.

[51] Int. Cl.⁵ .................. G06F 12/00; G06F 3/00; G06F 13/00; G11C 8/00
[52] U.S. Cl. .................... 395/425; 395/400; 395/500; 365/230.05; 365/230.02
[58] Field of Search ........... 365/230.05, 238.5, 230.01, 365/230.02, 230.03, 230.04, 189.02; 395/425, 400, 500

[56] References Cited

U.S. PATENT DOCUMENTS

| | | | |
|---|---|---|---|
| 4,041,472 | 8/1977 | Shah et al. | 364/900 |
| 4,047,157 | 9/1977 | Jenkins | 364/900 |
| 4,120,048 | 10/1978 | Fuhrman | 365/230.05 X |
| 4,195,342 | 3/1980 | Joyce et al. | 364/200 |
| 4,205,373 | 5/1980 | Shah et al. | 364/200 |
| 4,245,307 | 1/1981 | Kapeghian et al. | 364/200 |
| 4,296,469 | 10/1981 | Gunter et al. | 364/200 |
| 4,309,754 | 1/1982 | Dinwiddie, Jr. | 364/200 |
| 4,317,168 | 2/1982 | Messina et al. | 364/200 |
| 4,354,256 | 10/1982 | Miyasaka | 365/238.5 X |
| 4,370,712 | 1/1983 | Johnson et al. | 364/200 |
| 4,371,925 | 2/1983 | Carberry et al. | 364/200 |
| 4,432,055 | 2/1984 | Salas et al. | 364/200 |
| 4,447,878 | 5/1984 | Kinnie et al. | 364/200 |
| 4,559,620 | 12/1985 | Blair | 364/900 |
| 44,586,131 | 4/1986 | Caudel et al. | 364/200 |
| 4,610,004 | 9/1986 | Moller et al. | 365/230.05 |
| 4,729,118 | 3/1988 | Gelsomini | 365/230.05 |
| 4,742,487 | 5/1988 | Bernstein | 365/230.05 X |
| 4,747,070 | 5/1988 | Trottier et al. | 364/900 |
| 4,847,759 | 7/1989 | Oklabdzija | 364/200 |
| 4,893,280 | 1/1990 | Gelsomini et al. | 365/230.05 |
| 4,916,658 | 4/1990 | Lee et al. | 395/425 |

FOREIGN PATENT DOCUMENTS 0206083 6/1986 European Pat. Off. .
0254648 7/1987 European Pat. Off. .

OTHER PUBLICATIONS

*IBM Technical Disclosure Bulletin*, vol. 28, No. 1, Jun., 1985, pp. 20-23, "Dual Port, Dual Data Width Random-Access Memory Controller".

Primary Examiner—Alyssa H. Bowler
Attorney, Agent, or Firm—Thomas E. Tyson; Keith Stephens

[57] ABSTRACT

An interface circuit for providing an interface with the parallel data bus that transfers information in a multiple of formats. The interface includes a control circuit that receives or sends control signals from or to the parallel bus to regulate the data transfer and to specify one of the plurality of formats. An addressing circuit, connected to the control circuit, is provided for computing addresses for each of the data received or sent according to the specified format. An accessing circuit connected to the bus, control and address circuits is provided to store or retrieve data from or to the bus according to the computed data addresses. This interface provides a means to serialize data when, in one format, the first word of a data transfer is provided on one part of the data bus but, in a second format, the first data word is provided on another part of the data bus.

10 Claims, 6 Drawing Sheets

R/W = READ/WRITE
S = STRING
B_CNT = BYTE CNT

ADDRESS

| Address | 0 – 31 |
|---|---|
| 00 | ISR |
| 01 | CONFIG |
| 02 | T_O COUNTER |
| 03 | RESERVED |
| 04 | RESERVED |
| 05 | RCV REG 0 |
| 06 | RCV REG 1 |
| 07 | RCV REG 2 |
| 08 | RCV REG 3 |
| 09 | RCV REG 4 |
| 0A | XMIT REG 0 |
| 0B | XMIT REG 1 |
| 0C | XMIT REG 2 |
| 0D | XMIT REG 3 |
| 0E | XMIT REG 4 |
| 0F | CCR |
| 10 | TAG WORD 0 |
| 11 | TAG WORD 1 |
| 12 | TAG WORD 2 |
| • | • |
| 1E | TAG WORD E |
| 1F | TAG WORD F |

FIG. 9

MULTIPLE DATA FORMAT INTERFACE

This is a continuation of application Ser. No. 07/273,286 filed Nov. 17, 1988, now abandoned.

DESCRIPTION

1. Field of the Invention

The present invention relates to data processing systems and more specifically to an information bus interface for the transfer of information in a data processing system.

2. Description of the Related Art

Data processing systems often include information buses for the transfer of information between a central processing unit and peripheral devices or between several central processing units. Traditionally, these information buses will transfer data in single words serially over the information bus. However, as the requirements for information transfer rates for processing units increase, this technique will not be able to provide the data needed at the rate required.

U.S. Pat. No 4,747,070 entitled "Reconfigurable Memory System" discloses a memory system and controller where the memory includes a capability to provide serial access or parallel access. In the parallel access, the memory is configured with an address translator which chooses one of several bank output buses as the memory outputs to the system processor. In another embodiment, a cache is provided to store the information on the non-selected bank output buses.

U.S. Pat. No. 4,370,712 entitled "Memory Controller with Address Independent Burst Mode Capability" discloses a memory controller that includes the capability to provide a number of words starting at any specific word boundary from several memory modules.

*IBM Technical Disclosure Bulletin*, Vol. 28, No. 1, June, 1985, pages 20-23, entitled "Dual Port, Dual Data Width Random-Access Memory Controller" discloses an invention that permits two processors to asynchronously access a common memory even though the processors have different data widths.

In the present invention, multiple data word buses are provided in the information bus. However, different data formats are also provided wherein the first word in one format will appear on a first bus wherein in a second format the first data word will appear on the second bus.

It is object of the present invention to provide an interface to a information bus having multiple data word buses with several data transfer formats. It is a further object of the present invention to provide the means to access the first data word on one data bus according to one specified format even though other different formats will provide the first data word on different data buses.

SUMMARY OF THE INVENTION

In accordance with the present invention, an apparatus for interfacing with a parallel data bus transferring information in multiple formats is provided. The apparatus includes a control circuit that receives or sends control signals from or to the parallel bus for regulating data transfer and for specifying one of plurality of formats. An addressing circuit is provided that has connected to the control circuit for computing addresses for each of the data that is received or sent according to the specified format. An accessing circuit connected to the bus control circuit and addressing circuit is also provided for storing or retrieving data for the bus according to the computed address.

In a preferred embodiment, the accessing means stores data to or receives data from a circuit that serially stores the data according to the computed address. In this embodiment, the addressing circuit computes the addresses according to either a first format having the first data received on a first data bus, or a second format having the first data word on a second data bus. In this embodiment the first format specifies a single word transfer and the second format specifies a string transfer or transfer of several data words serially.

BRIEF DESCRIPTION OF THE DRAWING

The novel features believed characteristic of the invention are set forth in the appended claims. The invention itself, however, as well as other features and advantages thereof, will be best understood by reference to the following description of the preferred embodiment, when read in conjunction with the accompanying figures, wherein:

FIG. 9 is a block diagram illustrating the storage in the register file 30.

DESCRIPTION OF THE PREFERRED EMBODIMENT

Figure 1:
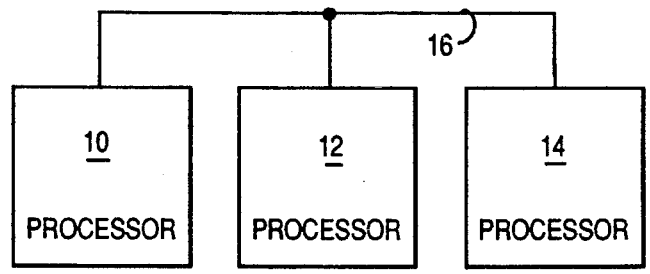
FIG. 1 is a block diagram illustrating several terminals connected to an information bus.

In the present invention, a processor architecture is provided that is connected by input/output controllers to a serial input/output bus. This bus is a high speed eight byte wide address and data bus. Once an operation has started on this bus, according to its convention it must run until completion. In other words, once a transfer has begun, it cannot be suspended. The input/output controllers that are attached to this bus are then required to buffer all data to or from the bus for its respective processor. FIG. 1 illustrates a simple block diagram of such a structure. In FIG. 1 processors 10, 12 and 14 are interconnected by an information bus 16. This information bus 16 provides address data and control signals for the transfer of information between processors 10, 12 and 14.

This invention addresses the bus interface control circuitry that provides for the buffering of data.

Figure 2:
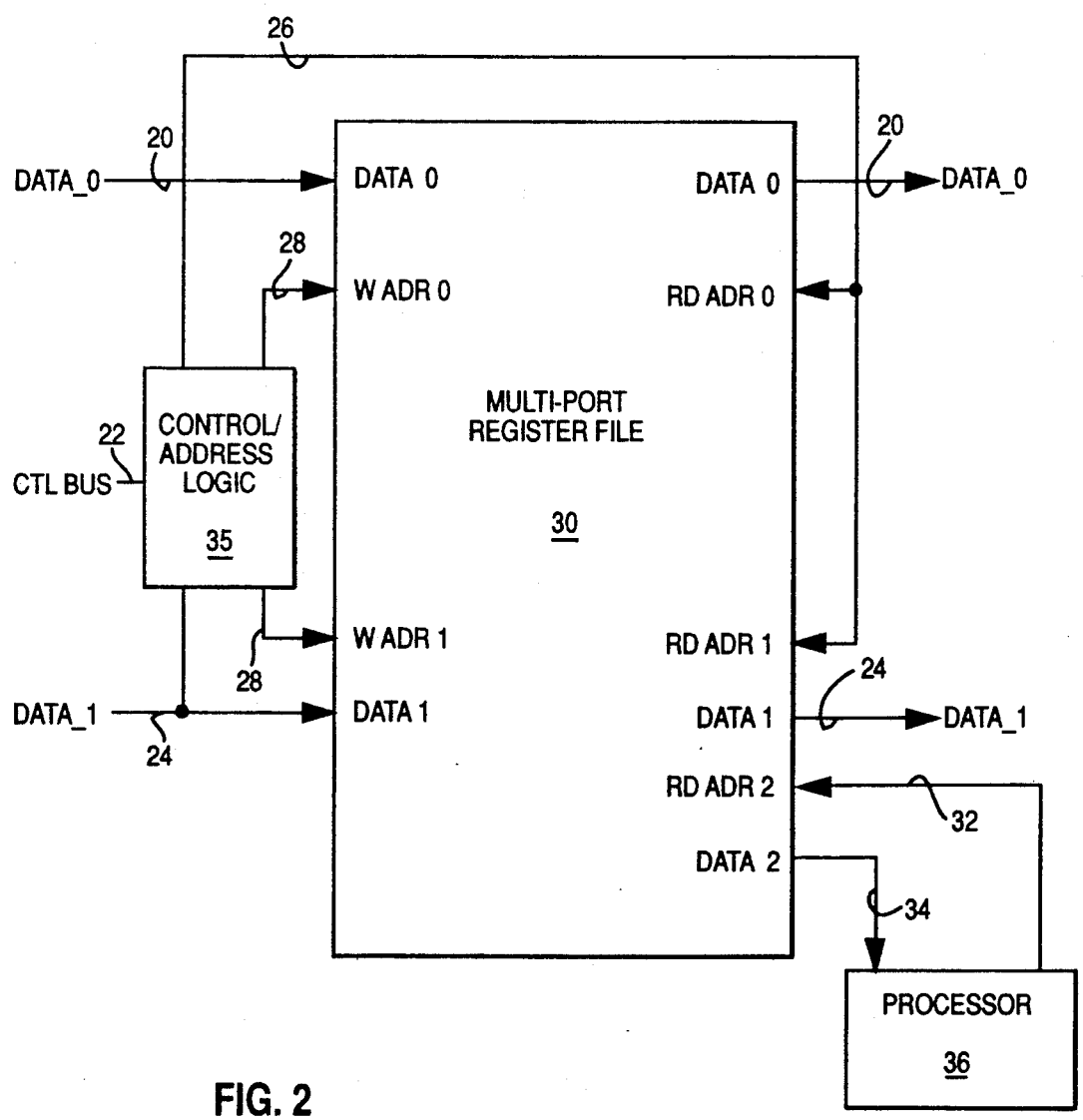
FIG. 2 is a diagram of the information bus interface circuit.

FIG. 2 is a block diagram of the input/output controller for the information bus. The information bus consists of a control and address bus 22 connected to control logic 35. Data buses 20 and 24 are connected to the multi-port register file 30. Data buses 20 and 24 provide both input and output capability for the data words on the information bus. Control logic 35 is connected via lines 28 and 26 to the multi-port register file to provide read and write addresses and the read and write control signals (rd adr 0, rd adr 1, w adr 0, and w adr 1). The multi-port data file provides data to slave processor 36 via line 34 and receives address information from slave processor 36 via line 32.

Figure 3:
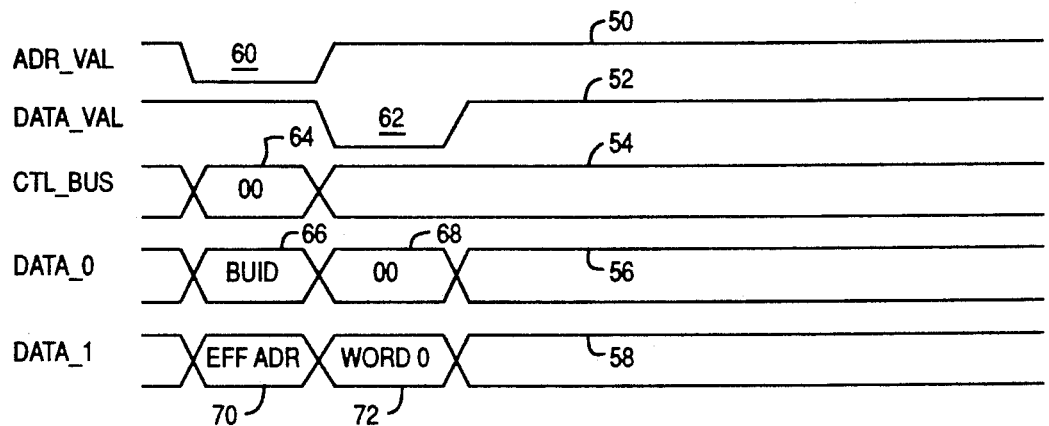
FIG. 3 is a timing diagram illustrating a single word write transfer.
Figure 4:
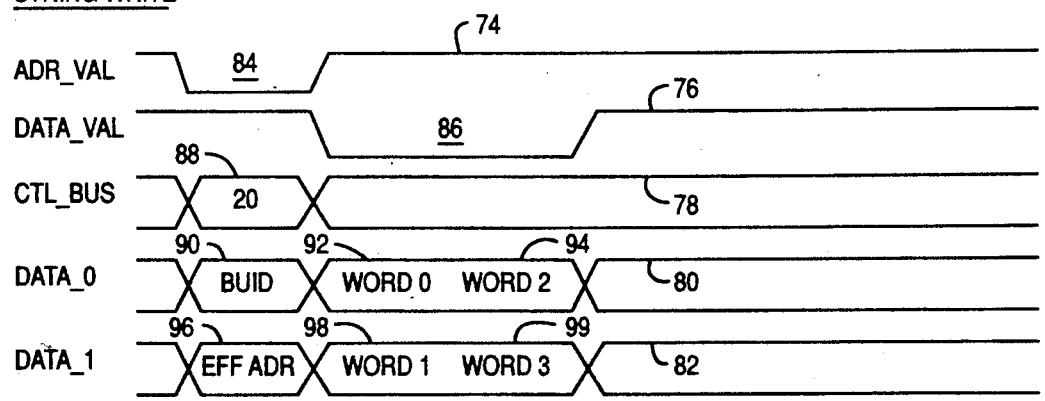
FIG. 4 is a timing diagram illustrating a string write transfer.

FIGS. 3 and 4 are timing diagrams illustrating the single word write format and string write format respectively. In FIG. 3, an address valid signal on line 50 is provided at time 60. The address valid signal is provided to the control logic 35. At time 60 the control bus line 54 receives a "00" at time 64. Also on data word 0, line 56, the bus unit ID "buid" is provided at time 66. This is the identifier for the specific bus unit. At the same time, data word 1 on line 58 provides the effective address at time 70. The effective address is the address in the register file 30 for the storage of the data.

The data valid signal, line 52, is provided at time 62. The contents of data word 0, line 56, at time 68 is a don't care condition. Data word 1, line 58, provides the word zero at time 72 (i.e., the single word being written).

In FIG. 4, a string write format is illustrated. A string write provides a contiguous transfer of words. The address valid signal on line 74 is active during time period 84. The control bus signal on line 78 provides a "00" at time 88. On the data word 0 line, line 80, the bus unit identifier (buid) is provided at time 90. On the data word 1 line, line 82, the effective address is provided at time 96. Then, during the data valid time 86, line 76, the data word transfers are provided. Data word 0 contains word 0 at time 92 and word 2 at time 94. Likewise, data word 1 provides word 1 at time 98 and word 3 at time 99.

Comparing the data transfers of FIGS. 3 and 4, its obvious that the first word (word 0) in a single word write format is provided on the data word 1 bus, but in a string write format, the first word (word 0) is provided on the word 0 bus. Therefore, to store the data words efficiently (i.e., in the same starting location in memory), the data bus interface must address the first data word from the proper data word bus.

Figure 5:
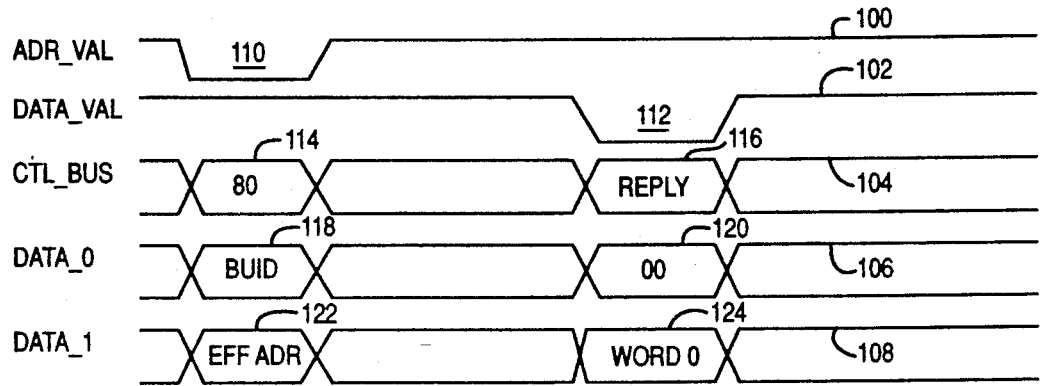
FIG. 5 is a timing diagram illustrating a single word read transfer.
Figure 6:
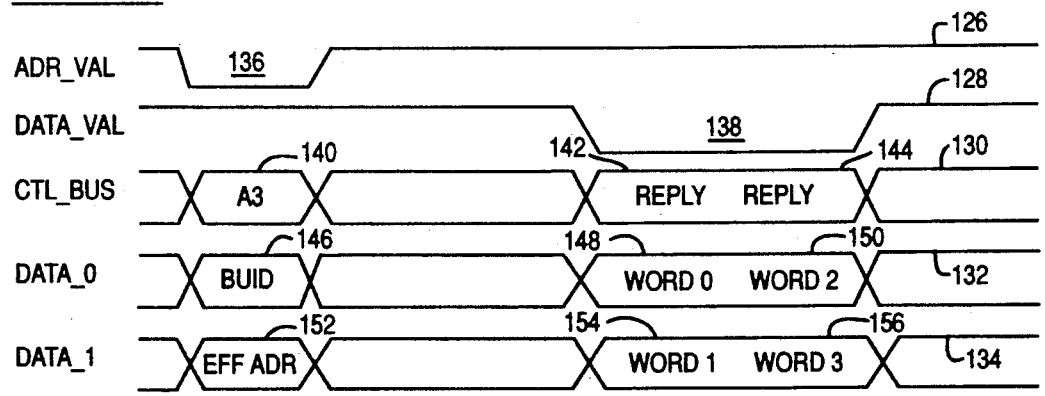
FIG. 6 is a timing diagram illustrating a string read transfer.

FIGS. 5 and 6 illustrate the timing diagrams for the single word read and string read formats respectively. In FIG. 5, the address valid signal, line 100, is active at time 110. During this time, the control bus, on line 104, provides an "80" at time 114. The bus unit identifier (buid) is provided at time 118 on the data word 0 line, line 106. At time 122, the data word 1 bus, line 108, provides the effective address. The data valid line, line 102 is activated by the device being read at time 112. At that time, the control bus, line 104, provides the reply indication at time 116. On the data word 0 line, line 106, a "00" is provided as a "don't care" signal. On the data word 1 line, line 108, the read word (word 0) is provided at time 124.

In the string read format of FIG. 6, the address valid signal, line 126, is provided at time 136. At this same time, time 140, the control bus line, line 130, provides a "3". Also, the data word 0 line, line 132, provides the bus unit identifier (buid) at time 146 and the data word 1 line, line 134, provides the effective address at time 152. Then the data valid line, line 128, is activated at time 138 by the device being read. The first reply indication is provided on the control bus 130 at time 142 indicating that the data word 0 line, line 132, contains word 0 at time 148 and the data word 1 line, line 134, contains word 1 at time 154. The second reply signal on the control bus line 130 at time 144 indicates that the data word 0 line 132 contains word 2 at time 150 and that the data word 1 line, line 134, contains word 3 at time 156.

Figure 7A:
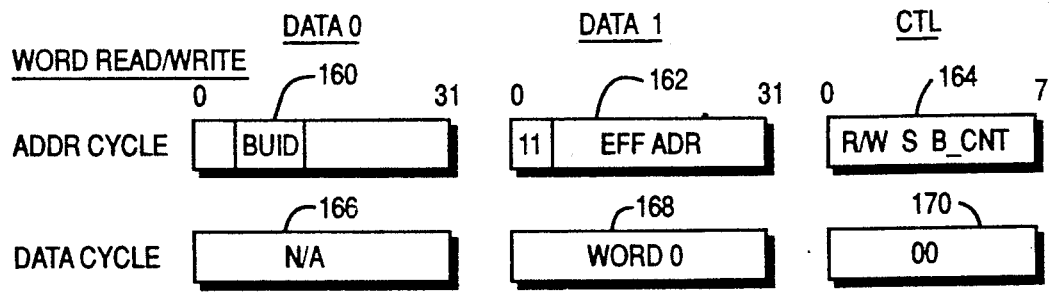
FIG. 7a is a diagram illustrating the single word read/write transfer format.

FIG. 7a illustrates the 32 bit format during the address cycle and data cycle for the single word read/write operations discussed in FIGS. 3 and 5. During the address cycle, the bus unit identifier 160 is provided together with the effective address 162 and the control word 164. The control word specifies whether the operation is a read or write, a single word or string operation and if a string, the byte count. During the data cycle the contents on the data word 0 line is a don't care 166 and the contents of the data word 1 bus is the data word (word 0) 168. The control word 170 is a "00".

Figure 7B:
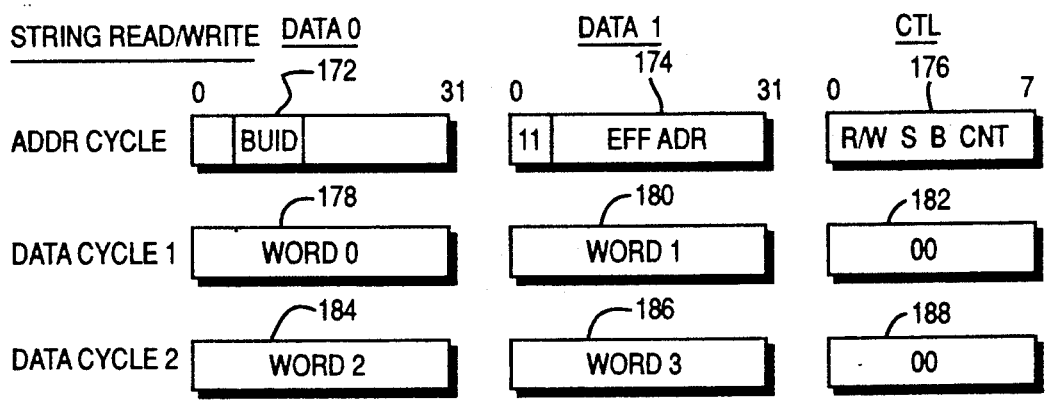
FIG. 7b is a diagram illustrating the string read/write transfer format.
Figure 7C:
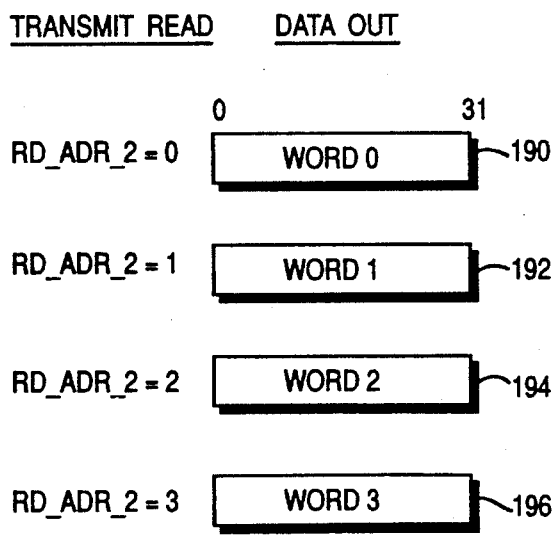
FIG. 7c is a diagram illustrating the serial storage of data words in a register file.

FIG. 7b illustrates the string read/write format. During the address cycle the bus unit identifier 172 is provided on the data word 0 line 172 and the effective address 174 is provided on the data word 1 line. At this time, the control word 176, is provided to specify the type of operation and the byte count. During data cycle 1, the first word (word 0) 178 is provided on the data word 0 line and the second word (word 1) 180 is provided on the data word 1 line. The control word 182 is set to "00". During data cycle 2, the third word (word 2) 184 is provided on the data word 0 line and the fourth word (word 3) 186 is provided on the data word 1 line. Again, a "00" is provided as the control word 188. The multi-port register file 30 (FIG. 1) always stores the first read word in the first read word location 190 even though the first word in a single word read operation appears on the data word 1 bus and in the string read operation appears on the data word 0 bus. In a string operation the data words are stored as illustrated in FIG. 7.

Figure 8:
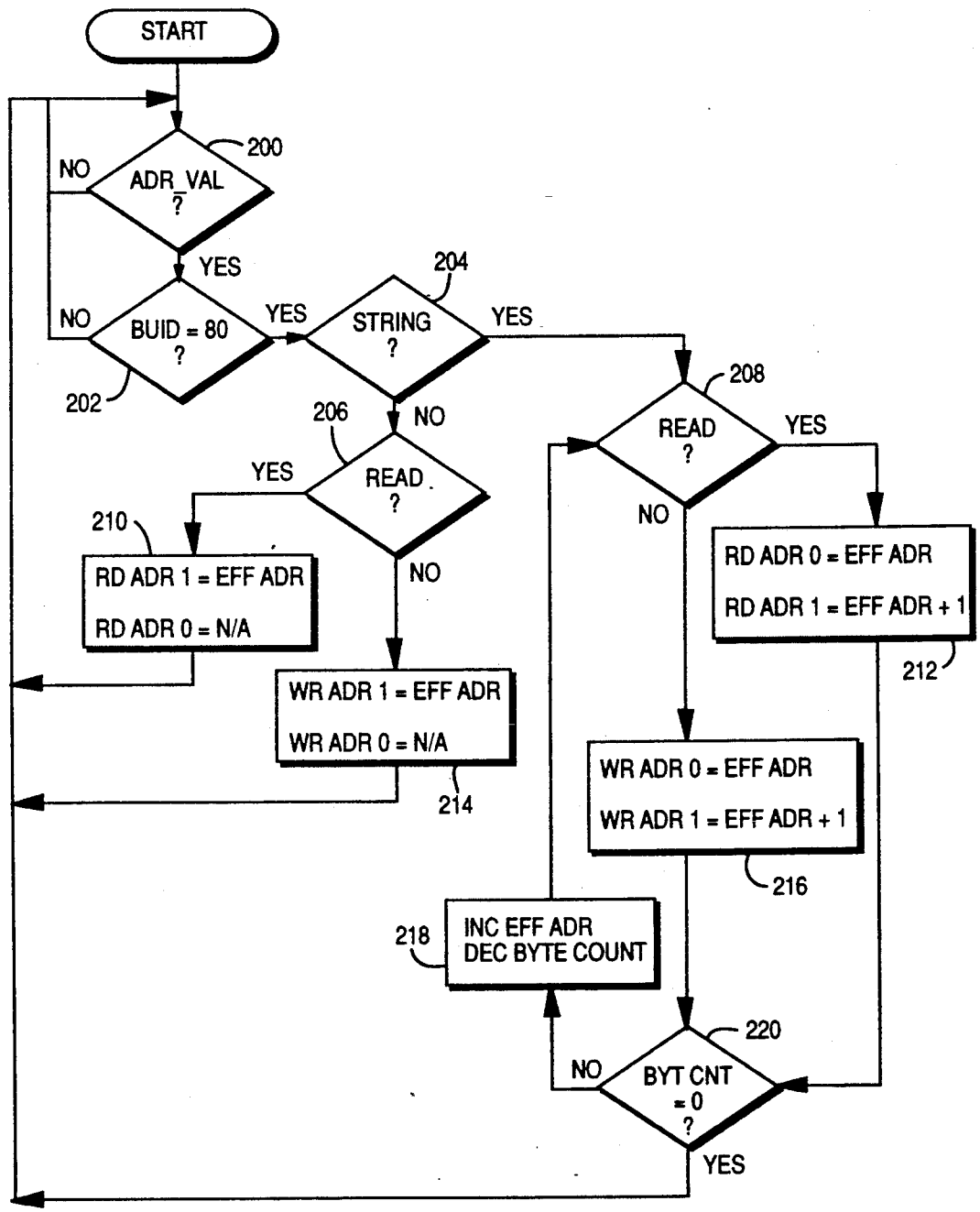
FIG. 8 chart illustrating the operation of the information bus interface.

FIG. 8 illustrates the control flow for the storage of the data words in the multi-port register file. Specifically, the controller in the multi-port register file 30 (FIG. 1) provides the address for storing the data word in the register file according to the format of the information transfer. In FIG. 8, step 200 determines whether the address valid line is active. If not, the controller waits until the address valid line is active. When active, the controller determines, in step 202, if the appropriate bus unit identifier is present. In this example, "80" is the identifier for the present controller. If the bus unit identifier is not the identifier for the controller, the controller returns to step 200. However, if the bus unit identifier is the bus unit identifier for that controller, the controller proceeds to step 204 to determine from the control line whether or not the information transfer is a string transfer. If the transfer is not a string transfer, the controller proceeds to step 206 to determine if the single word transfer is a read transfer. If the operation is a read transfer, the controller proceeds to step 210 to set the read address 1 as the effective address and the read address 0 as a don't care. Returning to step 206, if the single word operation is a write operation, the controller proceeds to step 214 to compute the write address 1 as the effective address and the write address 0 as a don't care. Exiting steps 210 or 214, the controller returns to step 200.

Returning to step 204, if the operation is a string operation, the controller proceeds to step 208 to determine whether the operation is a read or a write. If the operation is a read, the read address 0 is set equal to the effective address and the read address 1 is equal to the effective address plus 1 in step 212. The controller then proceeds to step 220 to determine if the byte count is 0. If not, in step 218 the effective address is incremented. Then the controller proceeds back to step 208 to continue this loop until the byte count is 0. When the byte count becomes 0, the controller exits step 220 and returns to step 200. Returning to step 208, if the string operation is a write operation, the controller proceeds to step 216 to compute the read address 0 as the effective address and the write address 1 as the effective address plus 1. The controller then proceeds to step 220 to begin the loop including step 218 back to step 208 until the byte count in step 220 is 0 as previously discussed.

Although this invention has been described with reference to the specific embodiment, this description is not meant to be construed in a limiting sense. Various modifications of the disclosed embodiment, as well as other embodiments of the invention will become apparent to those persons skilled in the art upon reference to the description of this invention. It is, therefore, contemplated that the appended claims will cover any such modifications or embodiments that fall within the true scope of this invention.

What is claimed is:

1. An apparatus for interfacing with a parallel data bus transferring information in multiple formats, said apparatus comprising:
   (a) first means connected to receive control information from said parallel bus specifying one of a plurality of formats, for computing addresses for each data received according to either a first format having a first data word on a first data bus portion of said data bus or a second format having the first data word on a second data bus portion of said data bus:
   wherein first means computes said address according to the first format when the transfer includes a single data word;
   said first means computes said address according to the second format when the transfer includes a plurality of data words; and
   (b) second means, connected to said bus and said first means for storing data from said first data bus portion or said second data bus portion of said data bus according to the computed address and detection of the first format or the second format.

2. An apparatus according to claim 1 wherein said second means includes a means for serially storing said data according to said computed address.

3. A apparatus for interfacing with an information bus having a plurality of data word busses transferring data words in one of a plurality of formats, said apparatus comprising:
   (a) first means connected, to said information bus and according to one of a plurality of formats, for computing addresses for each data received according to a first format having a first data word on a first data bus or a second format having the first data word on a second data bus:
   wherein said first means computes said addresses according to the first format when the transfer includes a single data word; and
   control and address means computes said addresses according to the second format when the transfer includes a plurality of data words; and
   (b) means connected to said bus and first means for storing data from said first data bus or said second data bus according to the computed address and detection of the first format or the second format.

4. An apparatus according to claim 3 wherein said apparatus includes means, connected to said first and second data buses, for simultaneously transferring data words on said data word buses.

5. An apparatus according to claim 4 wherein said storing means includes a means for contiguously storing said data according to said computed address.

6. An apparatus for interfacing with a parallel data bus and transferring information in multiple formats, said apparatus comprising:
   (a) first means, connected to receive control information from said parallel bus and specifying one of a plurality of formats, for determining addresses to store data sent according to either a first format having a first data word on a first data bus portion of said data bus or a second format having the first data word on a second data bus portion of said data bus;
   wherein said first means computes said addresses according to the first format when the transfer includes a single data word; and
   said first means computes said addresses according to the second format when the transfer includes a plurality of data words; and
   (b) second means, connected to said bus and said first means, for providing data to either said first bus portion or said second data bus portion according to the computed address and based upon the first format or the second format.

7. An apparatus according to claim 6 wherein said second means includes a means for serially retrieving said data according to said computed address.

8. An apparatus for interfacing with an information bus having a plurality of data word buses transferring data words in one of a plurality of formats, said apparatus comprising:
   (a) first means connected to said information bus and according to one of a plurality of formats, for computing addresses for each data sent according to a first format having a first data word on a first data bus or to a second format having the first data word on a second data bus;
   wherein said first means computes said addresses according to the first format when the transfer includes a single data word; and
   control and address means computes said addresses according to the second format when the transfer includes a plurality of data word; and
   means, connected to said bus and first means, for providing data from either the first or second data bus according to the computed address and based upon the first format or the second format.

9. An apparatus according to claim 8 wherein said apparatus includes means for simultaneously transferring information on said data word buses.

10. An apparatus according to claim 9 wherein said providing means includes a means for serially providing said data according to said computed address.

* * * * *

UNITED STATES PATENT AND TRADEMARK OFFICE
CERTIFICATE OF CORRECTION

PATENT NO. : 5,146,572
DATED : September 8, 1992
INVENTOR(S) : Roger N. Bailey and Robert L. Mansfield It is certified that error appears in the above-identified patent and that said Letters Patent is hereby corrected as shown below:

Col. 1, line 49, after "is", please insert --the--;
         50, please delete "a" and substitute therefor --an--;
Col. 2, line 40, please delete "and";
         41, after "8", please insert --is a flow--;
Col. 3, line 37, please delete "its" and substitute therefor --it is--;
Col. 5, line 54, please delete "A" and substitute therefor --An--; and
         58, please delete ",".

Signed and Sealed this

Ninth Day of November, 1993

Attest:

BRUCE LEHMAN

Attesting Officer

Commissioner of Patents and Trademarks